United States Patent Office 3,475,487
Patented Oct. 28, 1969

3,475,487
OXOCYCLOALKYLIDENEAMINO BENZOIC ACIDS
Gerhard R. Wendt, Havertown, Pa., assignor to American Home Products Corporation, New York, N.Y., a corporation of Delaware
No Drawing. Filed June 15, 1966, Ser. No. 557,618
Int. Cl. C07c 101/42; A61k 27/00
U.S. Cl. 260—518                                    7 Claims

ABSTRACT OF THE DISCLOSURE

Compounds identified as o-(3-oxocyclopentylideneamino and cyclohexylideneamino)benzoic acids are prepared having anti-inflammatory activity.

This invention relates to oxocycloalkylideneamino benzoic acids and more particularly to o-(2-substituted-3-oxocycloalkylideneamino) benzoic acids having useful pharmacological action.

The compounds of the invention may be illustrated by the following general formulae

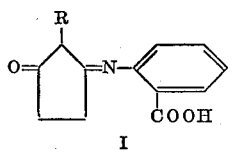

I and

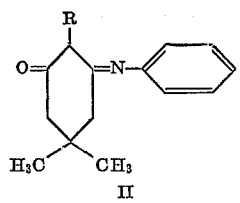

II

In formulae I and II, the radical R is intended to represent hydrogen or lower alkyls, preferably from 2 to 4 carbon atoms.

The compounds are prepared by reacting a 1,3-cyclopentanedione or a 1,3-cyclohexanedione with anthranilic acid in a relatively high boiling solvent, for example xylene, and a small amount of an organic acid, preferably acetic or p-toluenesulfonic acid, under refluxing conditions. Precipitation of the desired compound will take place and it may be isolated by filtration.

The preparation of the alicyclic diones used as starting materials may be prepared in known manner if not commercially available. A method of preparation of cyclopentanediones involves first preparing a corresponding trione by reacting ethyl oxalate with a ketone which may be represented by the formula $CH_3 \cdot CO \cdot CH_2R$ in which R represents the desired radical in the 2-position of the final dione, in the presence of sodium methylate, the reaction being carried out at about 75° to −5° C. This will form a cyclopentanetrione glyoxlate. The latter is hydrolyzed with acid and then treated with semicarbazide hydrochloride and a 1,2,4-cyclopentanetrione - 1 - semicarbazone is formed and isolated. The latter is treated with storng alkali, for example, potassium hydroxide. The reaction mixture is then neutralized with acid and the desired cyclopentane - 1,3 - dione is then extracted from the reaction mixture.

The compounds of the invention have been found pharmacologically active, including antibacterial action when tested against strains of Bacillus subtilis, Escherichia coli, Lactobacillus casei, Salmonella paratyphi, and Staphylococcus aureus, and antiviral activity when tested against a Columbia strain of poliomyelitis. In addition, compounds of the invention have shown substantial anti-inflammatory activity in the animal body. Thus, the compounds are ocnsidered useful in the field of experimental and comparative pharmacology. A dosage level of 5 to 400 mg. per kilogram will achieve the desired effect, administered either orally or parenterally, and combined, if desired, with an excipient or substantially inert carrier of the usual pharmaceutical type.

To describe the best mode for preparing the compounds, the following examples are given for illustrative purposes. The temperatures as given are to be understood as being in degrees centigrade.

EXAMPLE 1 o-(2-methyl-3-oxo-cyclopentylideneamino) benzoic acid

A suspension of 22.3 mmoles (2.5 g.) of 2-methyl-1,3-cyclopentanedione, 22.3 mmoles (3.1 g.) of anthranilic acid monohydrate in 100 ml. of xylene was refluxed in an oil bath, using a Dean-Stark separator and with stirring for 3 hours during which time a brown precipitate was formed. After cooling, the precipitate was filtered, washed with ether and recrystallized from N,N-dimethylformamide-ethanol (1:1), yielding 3.0 g. (61%) of the title compound, M.P. 239–241°. The NMR spectra confirmed the structure.

Found: C, 67.30%; H, 5.42%; N, 6.10%. $C_{13}H_{13}NO_3$ requires: C, 67.52%; H, 5.67%; N, 6.06%.

EXAMPLE 2 o-(2 ethyl-3-oxo-cyclopentylideneamino) benzoic acid

An equimolar mixture of 3.0 g. (25.8 mmoles of 2-ethyl - 1,3 - cyclopentanedione and 3.5 g. (25.8 mmoles) of o-amino benzoic acid in 75 ml. of xylene and 0.1 ml. of acetic acid were refluxed for 5 hours using a Dean-Stark water separator, and then cooled. The resulting precipitate was filtered, washed with ether and recrystallized with ethanol, yielding 1.8 g. (27.3%) of the title compound, M.P. 222–225°.

Found: C, 68.41%; H, 6.38%; N, 5,61%. $C_{14}H_{15}NO_3$ requires: C, 68.53%; H, 6.61%; N, 5,71%.

EXAMPLE 3 o-(2-propyl-3-oxo-cyclopentylideneamino)benzoic acid

A suspension of 4.3 g. (30.0 mmoles) of 2-propyl-1,3-cyclopentanedione, 4.1 g. (30 mmoles) of anthranilic acid and 0.57 g. (3 mmoles) of p-toluene-sulfonic acid, monohydrate, in 100 ml. of xylene was refluxed in an oil bath for 3 hours using a Dean-Stark water separator. The resulting precipitate was filtered, washed with ether and recrystallized from N,N-dimethylformamide-water (1:1), yielding 5.6 g. (69%) of the title compound, M.P. 223–226°.

Found: C, 69.05%; H, 6.55%; N, 5.60%. $C_{15}H_{17}NO_3$ requires: C, 69.48%; H, 6.61%; N, 5.40%.

EXAMPLE 4 o-(2-butyl-3-oxo-cyclopentylideneamino) benzoic acid

A suspension of 4.6 g. (30 mmoles) of 2-butyl-1,3-cyclopentanedione, 4.1 g. (30 mmoles) of anthranilic acid and 1.0 ml. acetic acid in 100 ml. of xylene was refluxed in an oil bath, and with stirring for 5 hours using a Dean-Stark water separator. The resulting precipitate was filtered and washed with ether. Crystallization from alcohol-water (1:3) yielded 1.5 g. (18%) of the title compound, M.P. 216–220°.

Found: C, 69.98%; H, 6.78%; N, 5.20%. $C_{16}H_{19}NO_3$ requires: C, 70.31%; H, 7.01%; N, 5.13%.

EXAMPLE 5 o-3,3-dimethyl-5-oxo-cyclohexylideneamino) benzoic acid

A suspension of 4.2 g. (30.0 mmoles) of 5,5-dimethyl-1,3-cylohexane dione, 4.1 g. (30.0 mmoles) anthranilic acid and 0.57 g. (30.0 mmoles) of p-toluenesulfonic acid monohydrate in 100 ml. of xylene was refluxed with a Dean-Stark water separator and stirred for two hours. The resulting precipitate was collected, triturated with 100 ml. of hot water and filtered again. Recrystallization from nitromethane yielded 1.1 g. (14.0%) of the title compound, M.P. 175–176°.

Found: C, 69.71%; N, 6.45%; N, 5.14%. $C_{15}H_{17}NO_3$ requires: C, 69.48%; H, 6.61%; N, 5.40%.

We claim:

1. A compound illustrated by the formula:

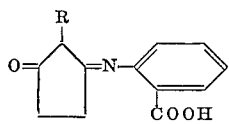

in which R represents a member of the group consisting of hydrogen and lower alkyl.

2. As a compound of claim 1, o-(2-methyl-3-oxocyclopentylideneamino) benzoic acid.

3. As a compound of claim 1, o-(2-ethyl-3-oxo-cyclopentylideneamino) benzoic acid.

4. As a compound of claim 1, o-(2-propyl-3-oxo-cyclopentylideneamino) benzoic acid.

5. As a compound of claim 1, o-(2-butyl-3-oxocyclopentylideneamino) benzoic acid.

6. A compound having the formula:

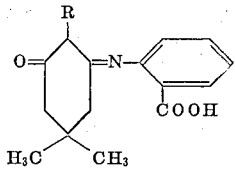

where R is selected from the group consisting of hydrogen and lower alkyl.

7. As a compound of claim 6, o-(3,3-dimethyl-5-oxocyclohexylideneamino) benzoic acid.

References Cited

UNITED STATES PATENTS 3,037,053   5/1962   Umezawa et al. _____ 260—514

LORRAINE A. WEINBERGER, Primary Examiner

L. A. THAXTON, Assistant Examiner

U.S. Cl. X.R.

260—999